Nov. 22, 1966 G. CESARI 3,286,836
LINED FLASK FOR MERCURY
Filed June 30, 1965
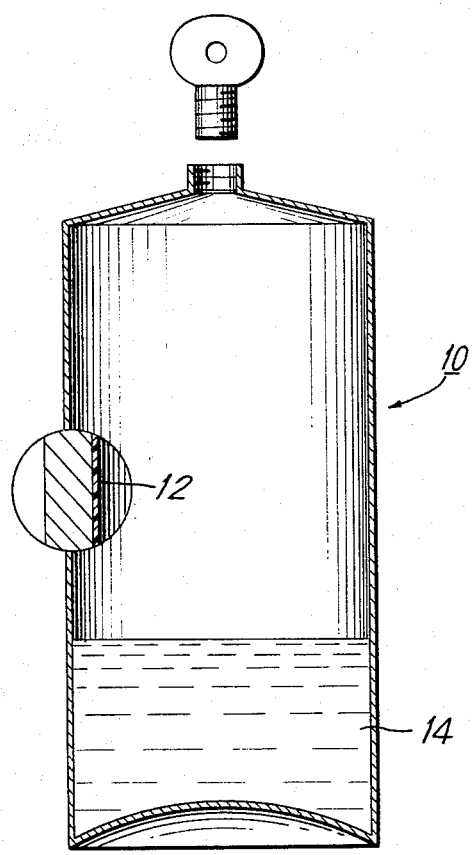
INVENTOR
*GIULIO CESARI*
BY
*Kinschstein, Kinschstein & Ottinger*
ATTORNEYS

3,286,836
LINED FLASK FOR MERCURY
Giulio Cesari, Rome, Italy, assignor to Monte Amiata, Società Mineraria per Azioni, Rome, Italy, a corporation of Italy
Filed June 30, 1965, Ser. No. 468,464
2 Claims. (Cl. 206—84)

This invention relates to a plastic lining or coating for the interior of a metal flask of the type having a small bore opening and which is conventionally used for the storing of mercury.

The present invention has for its principal object the provision of an improved method of effecting a coating of a character described which has good physical and chemical properties.

At present the normal practice with iron flask for containing mercury is to leave their interiors uncoated with the result that mercury contained therein often becomes contaminated by rust which forms on the interior wall of the flask.

It has been previously proposed to provide a plastic coating for the interior of a mercury flask wherein the plastic material is applied under heat. However, such processes which involved the use of heat necessitated the preheating of the flask to a high temperature and required the pouring of heated plastic material into the individual flask; but because, as is most frequently the case, the flasks have previously contained mercury, the preheating of such flasks resulted in the vaporisation of the mercury residues therein, these residues always being present in used flasks, so that operatives carrying out such processes were required to wear protective breathing masks.

Another drawback of such previous processes was their relatively high cost due to the amount of work entailed and the manpower required in the carrying out thereof and the relatively high thickness of the plastic coating which resulted therefrom, the same being in the order of several millimeters.

Internal plastic coatings obtained by materials hitherto employed were liable to splinter, flake or break up when the flask was impacted such as frequently occurs during the handling and transport thereof. The reduced efficacy of the coating which consequently occurred usually resulted in the contamination of the mercury within the flask as previously described.

With a view toward overcoming the above mentioned disadvantages I propose a method for applying a plastic coating to the interior wall surface of metal containers such as iron flasks, which method is characterized by the introduction into the interior of a metal container of a liquid coating mixture including an uncured epoxy resin of suitable fluidity, spreading the mixture to form a film on the interior wall surface, and then curing said mixture to form a cured solid very tough coating which is highly adherent to said surface.

In practice, the mixture which is introduced into the interior of the container includes, as well as the mentioned uncured epoxy resin, hardener (setting agent), the hardener being of the type which takes from about one hour to several hours to set the resin at room temperature. The mixture may be proportioned, and other well-known components added, for the purpose of obtaining the required degree of fluidity, it being appreciated that the thickness of the internal plastic coating will depend upon the fluidity of the mixture. The thickness of the plastic is at a minimum ten microns.

Ketones and aromatic hydrocarbons are added to the mixture as solvents for the uncured epoxy resin together with a polyamine as a cold hardening agent with the result that the resin has a high thixotropic property for obtaining a coating of constant thickness and also for obtaining a high degree of adhesion of the resin to the interior iron wall surface of a flask.

Throughout the interior wall surfaces of the flask a continuous, colorless elastic coating or film of smooth finish is obtained having high mechanical strength and which is also resistant to heat and chemical agents whilst in particular it is not reactive with mercury. The coating bonds excellently to the internal wall surface of the flask.

The application of the internal plastic coating of mercury flasks may be carried out on quantity production lines in the following manner:

Firstly and in accordance with usual practice the interiors of the iron flasks are cleaned as by means of compressed air, sandblasting, or by treatment with acids or other suitable substances. If appropriate, the cleaning substance is removed by a water flushing. It should be noted that the specific constitution of the iron of the flask and the method of manufacture employed to make the flask have no effect upon my invention.

Thereafter, a quantity of about one kilogram of the uncured epoxy resin mixture is introduce into a flask and the flask is then rotated about plural axes so that the mixture wets the entire interior well surface area of the flask. A typical rotational apparatus of the type which may be utilized to rotate one or more flasks about plural axes is shown in United States Letters Patent No. 2,969,-024 granted December 7, 1954, it being understood that the heating means shown in said patent is omitted.

The preferred uncured epoxy resin is of a fluid type which may be slowed hardened, e.g. over a period of less than one to several hours, by the addition of a setting agent. While it is convenient to use an uncured polyepoxide resin which is liquid at room temperature, an uncured resin which will liquefy in the presence of a slightly increased temperature and/or by the addition of a solvent and/or by the addition of a liquefying reactive diluent may also be used in the present invention.

Exemplificatively, I may employ an uncured [1] epoxy resin in liquid form admixed with a hardener (setting agent). An uncured epoxy resin is, as is well known, one capable of curing to become a hard infusible cross-linked polymeric final product known as a "cured" resin which is thermoset, i.e. will not liquefy under heat. An uncured epoxy resin in liquid form is a resin that is fluid in nature, either being inherently liquid, as for example an uncured epoxy resin the natural physical characteristics of which are such that in pure state it is liquid at temperatures down to 32° F. or an uncured epoxy resin that in its pure state is solid and for the purpose of this invention is rendered liquid as by the application of heat or by the incorporation of a liquefying reactive diluent. An uncured epoxy resin in liquid form also includes one or more uncured epoxy resins (or mixture thereof) that in its pure state is liquid and which for any one of various reasons includes reactive modifiers. Both the normally liquid and the normally solid but liquefiable uncured epoxy resins are well known to the art, a variety of the same being commercially available and a very great number being described in many publications, texts, articles and patents. Uncured epoxy resins which are not naturally liquid may be liquefied as mentioned above.

An uncured epoxy resin which is useful in the instant invention must include an uncured polyepoxide resin, i.e. a resin with more than one epoxide group per molecule. As noted above the uncured resin also may include other materials, e.g. reactive modifiers, such as reactive diluents, ---
[1] The term uncured as used herein denotes an epoxy resin that is a linear polymer or monomer, i.e. is not cross-linked.

flexibilizers, and terminators. The uncured epoxy resins can include linear aliphatic polyepoxides, cycloaliphatic polyepoxides, aromatic polyepoxides, heterocyclic polyepoxides or any type of mixed, saturated, unsaturated or derivative polyepoxide, or uncured polyepoxides of the above types substituted with non-interfering substitutes such as hydroxyl groups, ether link substituents, carboxyl groups, halogens, aliphatic groups, ester groups, aromatic groups and the like.

Purely by way of illustration it can be mentioned at this point that excellent results are secured with the basic uncured liquid polyepoxide resin, diepoxide O, which is the reaction product of one mole of bisphenol A with two moles of epichlorohydrin.

Typical of the uncured polyepoxide resins employable in the practice of the invention are:

Diepoxide O; the reaction product of bisphenol A with epichlorohydrin, other than diepoxide O, the structural formula [2] being

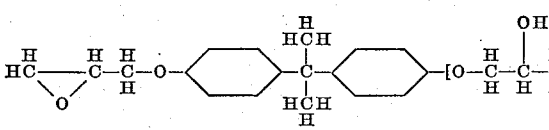 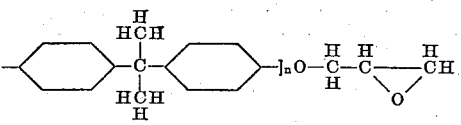

where $n$ is from zero to 15, it being noted that commercial uncured epoxy resins are mixtures of molecules having various values of $n$ so that conventionally $n$ may be either an integer or an irrational number, normally not exceeding 5, commercial examples of the foregoing being:

"Gen Epoxy" 190, wherein $n$ is between zero and 1 (made by General Mills Chemical Division, Kankakee, Ill.)
"Bakelite ERL" 2774, wherein $n$ is between zero and 1 (made by Union Carbide and Carbon Corporation, New York, N.Y.)
"Bakelite ERL" 3794, wherein $n$ is between zero and 1 [3]
"Araldite" 6020, wherein $n$ is between zero and 1 (made by Ciba Products Corporation, Fair Lawn, N.J.)
"Araldite" 6010, wherein $n$ is between zero and 1
"Epon" 828, wherein $n$ is between zero and 1$a$ (made by Shell Chemical Company, division of Shell Oil Company of New York, N.Y.)
"Epotuf" 6130, wherein $n$ is between zero and 1 made by Reichhold Chemicals, Incorporated, all the foregoing being liquid at room temperatures, i.e. 20° C.;

"Gen Epoxy" 525, wherein $n$ is between 2 and 3
"Araldite" 7071, wherein $n$ is between 2 and 3.
"Epotuf" 6301, wherein $n$ is between 2 and 3
"Epotuf" 6307, wherein $n$ is between 9 and 13 the last four uncured epoxy resins being solid at room temperature; the reaction product of diphenolic acid with epichlorohydrin; epoxidized cyclic aliphatic polyolefins, e.g. 3,4 epoxy-6-methylcyclohexylmethyl-3,4 epoxy-6-methylcyclohexanecarboxylate, a commercial example being "Epoxide" 201, a liquid at room temperature, (made by the Union Carbide Chemicals Co., a division of Union Carbide Corp. of New York, N.Y.);

resorcinol diglycidyl ether, a liquid at room temperature; and epoxidized long chain aliphatic polyols of which commercial examples are "Epon" X 71, "Epi-Rez" 5132 and "Epi-Rez" 507, all liquids at room temperature.

Although epichlorohydrin has been mentioned exclusively as one of the reactants in making uncured epoxidized resins, it is replaceable in such reactions by similar halogen-containing epoxides such as epibromohydrin; epi-iodohydrin; 3-chloro-1,2-epoxybutane; 3-bromo-1,2-epoxyhexane; and 3-chloro-1,2-epoxyoctane.

---
[2] The symbol ⌬ as used herein denotes the benzene ring.
[3] The manufacturer is not reidentified where the same generic trademark is used.

As has been mentioned above, the invention contemplates the use of reactive modifiers for various functions such as liquefying (if the uncured resin is solid), flexibilizing, chain terminating or reducing viscosity. These modifiers are intimately admixed with, so as to form a physical and effectively unitary part of the uncured epoxy resin or plural resin mixture. They enter into the reactions during the hardening. They may or may not include epoxy groups. Examples of such materials are: butyl glycidyl ether, 1,4 butanediol diglycidyl ether, phenyl glycidy ether, styrene oxide, triphenyl phosphite, allyl glycidyl ether, a mixture of mono and digycidyl ethers of 1,8 bis (hydroxy phenyl) pentadecane, a commercial example of which is "Cardolite" NC514 (made by the Minnesota Mining and Manufacturing Co. of St. Paul, Minn.), cresyl glycidyl ether, glycidyl methacrylate, styrene monomer, octylene oxide, limonene dioxide; and vinyl cyclohexene dioxide.

The amount of reactive modifiers present in the uncured epoxy resin mixture will, as is well known, depend upon the particular modifiers and resins that are employed and degree of modification that is required, in general there being from about $\frac{1}{200}$ to $\frac{1}{3}$ by weight of the modifiers in the mixture.

It also is within the scope of the invention to employ mixtures of uncured polyepoxide resins.

From the foregoing it will be understood that by the expression "uncured polyepoxide resins" as used herein, there are included all types and kinds of polyepoxide compositions (including reactive modifiers), that is to say, compositions that predominantly include plural epoxide groups on each molecule but which also may have some monoepoxide molecules, as well as other reactive compositions, the mixtures in general being characterized by their capability of being cured to form a hard infusible thermoset end product.

In the preferred form of the invention the uncured polyepoxide resin is liquid at room temperature (about 68° F.). Nevertheless, as indicated, the use of solid uncured polyepoxide resins is not precluded, i.e. is contemplated, providing that such solids are liquefied in the practice of the invention, that is to say, rendered liquid prior to coating.

If solid uncured polyepoxide resins are employed, they may be liquefied without raising their temperatures at all, e.g. liquefied by the use of a solvent or a liquefying reactive diluent. Typical solvents which can be employed are:

methyl isobutyl ketone,
toluol,
xylol,
diacetone alcohol,
ethyl alcohol,
Cellosolve (1 hydroxy 2 ethoxy ethane),
butyl Cellosolve (1 hydroxy 2 butoxy ethane),
methylene chloride,
methyl isobutyl carbinol,
n-butyl alcohol,
methyl ethyl ketone,
acetone,
"Solvesso" 150 (made by the Esso Standard Oil Co., New York, N.Y.)

Enough solvent is used to obtain the desired fluidity.

For the hardener there may be used primary, secondary and tertiary amines such as diethylamine, benzyldimethylamine, ethylenediamine, metaphenylenediamine, piperidine, dimethylaminopropylamine, diethylaminopropylamine, and tris (dimethylaminomethyl) phenol, acid anhydrides such as phthalic anhydride, chlorendic anhydride, pyromellitic dianhydride, and dodecenyl succinic anhydride, and strongly acidic materials such as boron trifluoride. The ratios between the amount of hardener and the amount of uncured resins are well known, being outlined, for instance, in "Epoxy Resins" by Irving Skeist, 1958, at pages 21 to 58.

By way of example a mixture of resin and hardener that will function in accordance with my invention is 100 parts by weight of Epon 828 to 10 parts by weight of diethylenetriamine. The mixture has a curing time of 24 hours at 80° F. and a pot life of several hours.

By way of another example, an uncured epoxy resin mixture is 500 parts by weight of the uncured epoxy resin Epon 1001 Shell, 250 parts by weight of the ketone methylisobutylketone and 250 parts by weight of the aromatic hydrocarbon xylol as solvents, 2 to 3% by volume of ureic resin to increase the resistance of the coating, and 25% by volume of any of the amine curing agents, as specified above, as a catalyzer and hardener.

After the uncured epoxy resin mixture has been introduced into a flask and then rotated in the manner above described, mixture in excess of the coating requirements is decanted from the flask into a second flask for effecting coating of the latter, the procedure being repeated with a number of flasks until the quantity of resin is used up. In this connection it is to be noted that the uncured resin remains in a sufficiently fluid state for about 8 to 10 hours after which it begins to solidify and is no longer utilizable for coating purposes.

After internal wetting of the flasks in the above manner, they are then allowed to drain by suspending them vertically, bottoms up. Hardening of the resin film or coating occurs in about 10 hours or so at room temperature but if desired the hardening and polymerization can be accelerated by subjecting the flasks to a temperature of 60 to 70° C.

In the accompanying drawing I have shown a flask embodying my invention.

Specifically I provide a flask 10 made of cast iron and having a configuration which is conventional for a mercury containing flask. The internal surface of the flask is lined with a coating 12 of an epoxy resin applied in the manner described above. After the lining has been hardened the flask is filled with a quantity of mercury 14 to be stored in the flask.

Owing to the low cost of the coating material and the simplicity of the method of its application it will be appreciated that the process according to this invention can be carried out very economically.

It thus will be seen that I have provided methods and articles which achieve the various objects of my invention and are well adapted to meet the conditions of practical use.

As various possible embodiments might be made of my above invention, and as various changes might be made in the embodiment above set forth, it is to be understood that all matter herein described or shown in the accompanying drawings is to be interpreted as illustrative and not in a limiting sense.

Having thus described my invention, I claim as new and desire to secure by Letters Patent:

1. A hollow iron container with a mouth, said container having a coating of a cured epoxy resin on the internal surface thereof and said container having a body of mercury stored therein.

2. A method of storing mercury comprising introducing mercury into an iron container the internal surface of which has a coating of a cured epoxy resin.

References Cited by the Examiner

UNITED STATES PATENTS

| | | | |
|---|---|---|---|
| 2,138,741 | 11/1938 | Kronquest | 117—97 |
| 2,152,516 | 3/1939 | White | 117—132 X |
| 2,284,551 | 5/1942 | Alexander | 206—84 |
| 2,668,782 | 2/1954 | Gross | 117—97 |
| 2,689,834 | 9/1954 | McNabb | 117—132 X |
| 2,712,384 | 7/1955 | Corneil | 206—84 |
| 2,882,251 | 4/1959 | Christenson | 117—132 X |
| 2,944,036 | 7/1960 | Floyd et al. | 117—132 X |
| 2,953,550 | 9/1960 | Frostick et al. | 117—132 X |
| 2,982,752 | 5/1961 | Phillips et al. | 117—132 X |
| 3,041,302 | 6/1962 | Leutner | 117—132 X |

THERON E. CONDON, *Primary Examiner.*

LOUIS G. MANCENE, *Examiner.*

J. M. CASKIE, *Assistant Examiner.*